United States Patent
Yamagishi et al.

[11] Patent Number: 6,003,876
[45] Date of Patent: Dec. 21, 1999

[54] SEALING MEMBER AND CAPPED BEARING

[75] Inventors: Takahiro Yamagishi, Yamatokoriyama; Shoji Kuradome, Kashiwara, both of Japan

[73] Assignee: Koyo Seiko Co., Ltd., Osaka, Japan

[21] Appl. No.: 08/793,484
[22] PCT Filed: Mar. 29, 1995
[86] PCT No.: PCT/JP95/00586
§ 371 Date: May 8, 1997
§ 102(e) Date: May 8, 1997
[87] PCT Pub. No.: WO96/06898
PCT Pub. Date: Mar. 7, 1996

[30] Foreign Application Priority Data

Aug. 26, 1994 [JP] Japan ................................. 6-225503

[51] Int. Cl.⁶ .............................. C09K 3/10; F16J 15/20; F16C 33/78
[52] U.S. Cl. ..................... 277/407; 277/549; 384/484
[58] Field of Search ................... 277/549, 402, 277/407; 384/477, 484, 489

[56] References Cited

U.S. PATENT DOCUMENTS

| | | |
|---|---|---|
| 3,837,660 | 9/1974 | Poggio ............................ 277/549 |
| 4,167,423 | 9/1979 | Williams ......................... 106/431 |
| 4,988,548 | 1/1991 | Takemura et al. ............... 428/36.8 |
| 5,171,787 | 12/1992 | Zama et al. .................... 525/105 |
| 5,183,613 | 2/1993 | Edwards ....................... 264/173.19 |
| 5,208,294 | 5/1993 | Brown .......................... 525/263 |
| 5,282,689 | 2/1994 | Imamura et al. ................ 384/492 |
| 5,383,728 | 1/1995 | Micca et al. ................... 277/575 |
| 5,402,858 | 4/1995 | Quantz et al. .................. 277/500 X |
| 5,456,327 | 10/1995 | Denton et al. .................. 277/407 X |
| 5,565,275 | 10/1996 | Schmidt et al. ................. 428/483 |
| 5,695,198 | 12/1997 | Iwamoto et al. ................ 277/407 X |

*Primary Examiner*—Anthony Knight
*Attorney, Agent, or Firm*—Pollock, Vande Sande & Amernick

[57] ABSTRACT

Sealing members, such as rolling bearing seal and oil seal, which are not only satisfactory in the fundamental properties required of them, such as sealing performance, heat resistance, mechanical strength and oil resistance, but also excellent in creep and PAG resistances. The member has an elastic part and is made by molding a modified nitrile rubber comprising a butadiene-acrylonitrile-acrylate copolymer and containing an organic peroxide as a vulcanizer, a metal oxide as a vulcanization aid, and a basic silicate as a reinforcing filler.

12 Claims, 4 Drawing Sheets

SEALING MEMBER AND CAPPED BEARING

TECHNICAL FIELD

The present invention relates to a sealing member such as a roller bearing seal, an oil seal or the like to be used in automotive components such as engines and related equipment, driving shafts, wheels, power steerings, etc., and household electrical appliance parts such as compressor rotary shafts etc., for instance, and to a sealed bearing having said sealing member.

BACKGROUND ART

As far as sealing members, such as roller bearing seals and oil seals, which are used in sealed bearings and the like to prevent the rotary shaft lubricating oil from leaking and for the like purposes are concerned, various contrivances have been made for their sealing property which is their primary function, and for maintaining its property. To roller bearing seals and oil seals for rotary shafts to be used in automotive components, household electrical appliance parts and the like, heat resistance enabling long-term service as well as durability and oil resistance at the surface of contact is essential in order that the sealing property may be maintained for a long time.

The roller bearing seals and oil seals which are used in the automotive engine and related equipment, e.g. the transmission, axles, etc., are generally maintained at 120 to 130° C. while the automobiles are running. However, when the car stops because of a traffic congestion, for instance, the effect of air cooling diminishes, allowing the seal temperature to exceed 150° C. at intervals. Therefore, heat resistance is an important requisite for assuring the mechanical strength. The water pump bearing seal, alternator bearing seal, wheel system seal, etc. are liable to be exposed to rain water (in some instances, salt water and muddy water), radiator water (LLC-containing water), etc., hence sufficient water resistance is essential.

In the case of bearing seals and oil seals to be used in the automotive transmission, transaxle, differentials and the like, not only functionally sufficient mechanical strength but also high heat resistance is required in order that they may serve the purpose continuously in the lubricating oil environment of 130 to 140° C. at the maximum. Furthermore, a contrivance is required for preventing contaminants in the lubricating oil from entering the bearings and further for reducing seal lip abrasion due to the contaminants. Thus, in addition to said mechanical strength and heat resistance, good creep resistance (CS) is essential.

In the case of sealing members to be used in automotive power steerings and the like, still higher mechanical strength is essential for resisting the high internal pressure, in addition to the above-mentioned heat resistance.

In the case of bearing seals and oil seals to be used in the automotive crankshaft, cam shaft and the like, a low-aniline-point performance is essential for resisting the engine oil or fuel oil which has the property to swell rubber, in addition to the above-mentioned heat resistance.

In the case of the bearing seal or oil seal for the compressor as a component of the automotive air conditioner, household or office air conditioner, refrigerator or the like, those conventional machine oils for compressor use which are based on mineral oils are being switched over to a synthetic lubricating oil polyalkylene glycol (PAG), from the viewpoint of compatibility with a substitute fluorocarbon, which has recently been used as a heating medium in lieu of the fluorocarbon which tends to destroy the ozone layer. Thus, Japanese Kokai Publication Hei-3-160186 discloses a technology of improving compressors using PAG as the lubricating oil and Japanese Kokai Publication Hei-3-281688 discloses a technology of using PAG as a synthetic lubricating oil in the refrigerating machine. PAG may gasify (as a volatilized oil or a mist) during use. In that case, the gasified PAG and air come into simultaneous contact with the bearing seals or oil seals, so that it is essential that these have sufficient PAG resistance.

Meanwhile, nitrile rubbers (NBRs) having good oil resistance have so far been used as the material for the above-mentioned bearing seals or oil seals. However, NBRs fail to satisfy the heat resistance requirement. For instance, they are not suited for use in the vicinity of an engine where the temperature may rise to about 150° C. The use of hydrogenated NBRs (HNBRs) as alternatives was considered. However, they are expensive, hence the use thereof presents a problem from the economic viewpoint.

Therefore, the use of acrylic rubbers (ACMs) or fluoro rubbers (FKMs) has been proposed. However, ACMs are disadvantageous from mechanical strength and oil resistance viewpoints and FKMs have drawbacks in that they are expensive and, hence, uneconomical.

A technology of incorporating a certain amount of a (meth)acrylate in butadiene and acrylonitrile which are components of the NBRs, to give modifiled nitrile rubbers with improved processability is disclosed in U.S. Pat. No. 2,395,017. Japanese Kokoku Publication Sho-47-21579 discloses a technology of copolymerizing butadiene, acrylonitrile, chloroacrylonitrile and an alkyl acrylate to give a modified nitrile rubber with improved heat resistance. Japanese Kokoku Publication Sho-60-11744 discloses a technology of copolymerizing a conjugated diene, an unsaturated nitrile and an unsaturated dicarboxylic acid ester and incorporating a specific additive in the copolymer to provide the same with heat resistance.

In Japanese Kokoku Publication Sho-62-59138, there is disclosed a technology of incorporating a vulcanization agent and a crosslinking agent in a modified nitrile rubber with a limited Mooney viscosity as obtained by specifying the proportions of the constituents, namely butadiene, acrylonitrile and a hydroxyalkyl (meth)acrylate, to thereby insure processability.

In the case of sealed roller bearings, which support rotating shafts in compressors, too, attention has so far been paid only to the use, as the material for sealing plates, of a material excellent from the lubrication and heat resistance viewpoints. Thus, from the cost viewpoint as well, the use of acrylic rubber materials and the like, for instance, has been preferred.

The grease so far used as a lubrication medium in bearings is composed of a poly-α-olefin base oil and, as a thickening agent, diurea. Therefore, EPDMs or chlorinated polyethylene (CM), though resistant to PAGs, has not been regarded as being suited as the sealing plate material mentioned above.

When a PAG is used as the lubricating oil in a compressor, for example in a swash type rotary compressor (FIG. 2), the lubricating oil PAG sealed in a cavity 11 of a sealed vessel 10 contributes to lubrication of the swash plate during rotation. However, at high temperatures encountered, for instance, when the compressor is used in an automotive air conditioner, the PAG is gasified and the gas goes through the clearance within the vessel and arrives at the roller bearing 12 on the rotary shaft 13. Once the PAG gas has arrived at the roller bearing 2 (FIG. 1), the sealing plates 5 and 6 which seal the roller bearing 2 are in contact with air at all times, and the sealing plates 5 and 6 come into a state of simultaneous contact with air and PAG gas.

Under such circumstances, due to simultaneous contact of the sealing plates with air and PAG gas, the sealing plates made of an acrylic rubber, which has previously been used for a urea-type grease, have presented problems, namely corrosion and deterioration.

To solve the above problems, an attempt was made to use nitrile rubbers (NBRs), which have a PAG-resistant characteristic, as materials for the sealing plates mentioned above. NBRs are also resistant to mineral oil-based greases, hence are suited for that purpose. However, their heat resistance, as determined in a heat aging test in air, is at most about 125° C. Thus, there is a problem that NBRs cannot be used in automotive air conditioners where a heat resistance of 130 to 150° C. is required.

It is conceivable to use hydrogenated NBRs in lieu of NBRs. However, though they solve the heat resistance problem, they raise the cost markedly, hence they can hardly be put to practical use.

DISCLOSURE OF THE INVENTION

None of the technologies mentioned above are directed to the development of a material that could be used for bearing seals or oil seals, and they have so far failed to satisfy the heat resistance, oil resistance, creep resistance, PAG resistance, and other requirements which are imposed on bearing seals or oil seals.

In view of the foregoing, it is a primary object of the present invention to provide a sealing member, such as a roller bearing seal or an oil seal, which satisfies those fundamental properties which are generally imposed thereon, namely the sealing property, heat resistance, mechanical strength and oil resistance requirements, and which is, in addition, excellent in creep resistance and PAG resistance.

Thus, according to the present invention, the sealing member has an elastic part formed by molding a modified nitrile rubber of the butadiene-acrylonitrile-acrylate type which contains an organic peroxide as a vulcanization agent, a metal oxide as a vulcanization accelerator and a basic silicic acid as a reinforcing filler.

The modified nitrile rubber to be used according to the present invention is a modification product of NBR as obtained by partly replacing the monomer component of NBR polymer with an acrylate ((meth)acrylic ester) which is inherently a constituent monomer of acrylic rubber.

The modified nitrile rubber to be used according to the present invention comprises the acrylonitrile and butadiene components as constituent monomers, as in the conventional NBR species.

However, the modified nitrile rubber to be used according to the present invention comprises, in addition to the above-mentioned acrylonitrile and butadiene components, an acrylate component as a further constituent monomer. This acrylate component is not limited to any particular species provided that it can be used in the modified nitrile rubber. Thus it includes, among others, (meth)acrylic esters, such as ethyl acrylate, propyl acrylate, butyl acrylate, ethyl methacrylate, propyl methacrylate, butyl methacrylate, β-hydroxyethyl acrylate, β-hydroxypropyl acrylate, β-hydroxyethyl methacrylate, β-hydroxypropyl methacrylate, β-hydroxypropyl acrylate, etc.

In the modified nitrile rubber to be used according to the present invention, the proportions of the acrylonitrile and butadiene components are preferably approximately the same as those in ordinary NBR species. Thus, for example, the acrylonitrile component preferably accounts for about 1 to 50% by weight and the butadiene component for about 1 to 98% by weight, while the content of said acrylate component is preferably 1 to 90% by weight. It is necessary, however, that the total content of the acrylonitrile and butadiene components in the modified nitrile rubber should amount to not less than 50% by weight. In the case of compressor sealing members for which particular consideration is to be given to PAG resistance, the content of the acrylate component mentioned above preferably amounts to 1 to 15% by weight, more preferably 5 to 10% by weight. When the proportion of said acrylate component is less than 1% by weight, the modified nitrile rubber will be insufficient in heat resistance, mechanical strength, oil resistance, creep resistance and PAG resistance, whereas when the content of the acrylate component exceeds 15% by weight, the sealing member will no longer have the fundamental properties required; thus, in either case, the object of the present invention cannot be accomplished.

The modified nitrile rubber to be used in the present invention is subjected to vulcanizing reaction with a combination of a metal oxide and an organic peroxide, without using any sulfur base vulcanization agent which is generally used in vulcanizing NBR.

As said metal oxide, there may be mentioned, among others, magnesium oxide and the like. Magnesium oxide is particularly preferred for the purpose of the present invention. The metal oxide is used preferably in an amount of 5 to 20 parts by weight, more preferably 6 to 10 parts by weight, per 100 parts by weight of the modified nitrile rubber.

The organic peroxide mentioned above includes, but is not limited to, 2,5-dimethyl-2,5-di(t-butylperoxy) hexyne-3,2,5-dimethyl-2,5-di(t-butylperoxy)hexane, 2,2'-bis(t-butylperoxy)-p-diisopropylbenzene, dicumyl peroxide, di-t-butyl peroxide, t-butyl benzoate, 1,1-bis (t-butyl-peroxy)-3, 3,5-trimethylcyclohexane, 2,4-dichlorobenzoyl peroxide, benzoyl peroxide, p-chlorobenzoyl peroxide, t-butyl peroxybenzoate, and di-t-butylperoxyisophthalate, among others. Among them, dicumyl peroxide is preferred.

The organic peroxide also mentioned above is used preferably in an amount of 1 to 10 parts by weight, more preferably in an amount of 2 to 5 parts by weight, per 100 parts by weight of the modified nitrile rubber.

In the practice of the present invention, a basic silicic acid is used as a reinforcing filler.

Silicic acid generally occurs as a solid acid and, in many cases, shows acidity and is scarcely soluble in water. On the contrary, the basic silicic acid to be used according to the present invention shows a basicity of pH 7 to 10 in aqueous suspension. As such, there may be mentioned, for example, silica (silica sand, diatomaceous earth, amorphous silica), synthetic silicic acid (white carbon) and, further, aluminum silicate (pyrophillite, kaolin), magnesium silicate (talc, finely divided talc), calcium silicate (Calsil HM700), aluminum sodium silicate (zeolex 23, HM500), calcium magnesium silicate, and the like.

Said basic silicic acid is recommendably used in an amount of 10 to 60 parts by weight, preferably 30 to 50 parts by weight, per 100 parts by weight of the modified nitrile rubber.

In incorporating the above-mentioned metal oxide, organic peroxide, and basic silicic acid in modified nitrile rubber in accordance with the present invention, other additives in common use, such as silane coupling agents, crosslinking auxiliaries, etc., may be combinedly used in appropriate proportions.

The sealing member of the present invention desirably has a (metal) case therewithin. By this, the sealing member of the present invention acquires rigidity, which is a characteristic required of the bearing seal and oil seal. The modified nitrile rubber having the above-mentioned constitution according to the present invention is also suited for adhesion to the (metal) case mentioned above.

The sealing member of the present invention can be applied to all uses in which the sealing property, heat resistance, mechanical strength, oil resistance, creep resistance and PAG resistance are required. The sealing member of the present invention, when it is of a type such that the seal itself is lubricated by the medium which is a sealed object (the so-called contact type) and when it is used under the conditions of the highest continuous working temperature of about 130° C. or the highest intermittent working temperature of about 150° C., produces marked effects.

The sealing member may also be of the non-contact type, however.

Typical examples of such use include, but are not limited to, sealed bearings. As uses of the sealing member of the present invention, there may be mentioned, for example, sealing members for engines and related components, such as water pump bearings, alternator bearings, tension pulley bearings, crankshaft bearings, camshaft bearings, etc.; sealing members for use in drive shaft systems, such as center bearings, transmission bearings, and transmission-axle-transfer bearings; sealing members for wheel systems, such as bearing-integrated hub unit seals etc.; sealing members for power steering systems, such as reciprocating (rod) seals, swing (pinion) seals; and sealing members for compressors, such as compressor seals etc.

Figure 1:
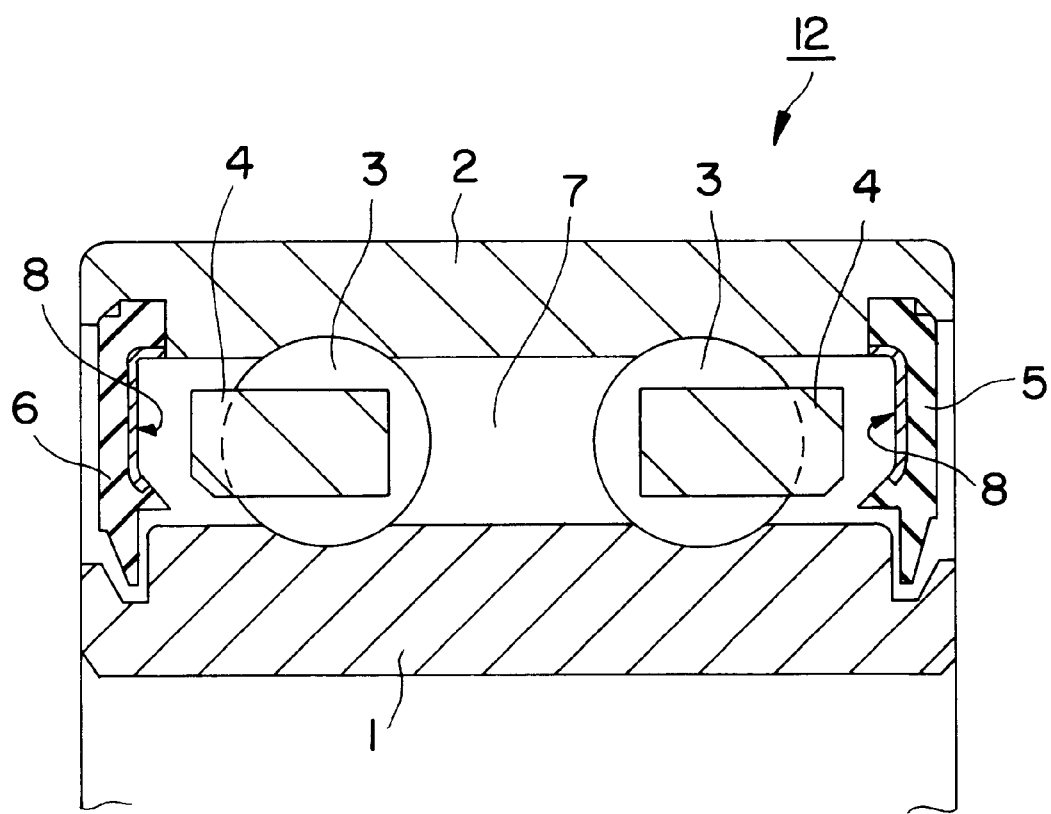
FIG. 1 shows a macrograph of a roller bearing.

1 . . . an inner ring
2 . . . an outer ring
3 . . . a ball
4 . . . a cage, and
5 and 6 . . . sealing members and 8 . . . metal case.

BEST MODES FOR CARRYING OUT THE INVENTION

The following test examples are further illustrative of the present invention. In the test examples, measurements were made by the following methods.

Mechanical properties were evaluated and other tests were performed according to JIS K 6301.

The abrasion resistance test was performed using a Williams abrasion tester and the results obtained in the comparative examples were expressed in terms of relative abrasion loss with the abrasion loss in Test Example 1 according to the present invention being taken as 100. In reporting the cost ratios for the comparative examples, the cost required in Test Example 1 according to the present invention was taken as 1.

The components weighed according to each formulation shown in Table 1 were kneaded on 6-inch rolls and test specimens were processed under the vulcanization conditions shown in Table 1. The results are shown in Table 2.

In Test Example 1 according to the present invention, neither thermal hardening nor dissolution occurred in any of the heat aging, oil resistance, PAG resistance and water resistance tests, the abrasion resistance was superior and the advantageousness from the viewpoint of cost was proved, as compared with the comparative examples.

Further, comparative experiments were performed by adding various vulcanization agents, vulcanization accelerators and reinforcing fillers to the modified NBR (JSR N640H, product of Japan Synthetic Rubber) used in Test Example 1 according to the present invention. The components compounded and the vulcanization conditions used in Test Example 2 and Comparative Examples 5 to 9 are shown in Table 3, and the results obtained are shown in Table 4.

The product of Test Example 2 was slightly inferior to that of Test Example 1 according to the present invention but produced no problem in the use thereof. The products of Comparative Examples 5 to 9 were inferior to those of Test Examples 1 and 2.

In Table 1 and Table 3, "JSR N640H" stands for a modified NBR produced by Japan Synthetic Rubber, "JSR N230S" for an NBR produced by Japan Synthetic Rubber, "Nipol AR-72" for an ACM produced by Nippon Zeon, "zetpol 2020" for a hydrogenated NBR produced by Nippon Zeon, "Viton E-430" for an FKM produced by Showa Denko Du Pont, "Nocrac CD" for an antioxidant produced by Ouchi Shinko Chemical Industrial Co., "Nipsil ER" for a neutral-basic silica species produced by Nippon Silica Industrial Co., "Carplex #1120" for a basic silica produced by Shionogi & Co., "Carplex XR" for an acidic silica species produced by Shionogi & Co., "Percumyl D-40" for an organic peroxide produced by Nippon Oil and Fats, "Peroximon F-40" for an organic peroxide produced by Nippon Oil and Fats, "Kyowamag #150" for magnesium oxide produced by Kyowa Chemical Industry, "KBM503" for a silane coupling agent produced by Shin-Etsu Chemical, and "Satintone No. 5" for an acidic calcined clay species produced by Engelhard Minerals.

In the PAG resistance test referred to in Table 2, Nippon Denso's No. 8 oil was used.

In Table 2, the evaluation criteria are as follows:

○: Good;
Δ: Rather poor;
X: Poor

TABLE 1

| Component (weight parts) | Test Example 1 | Comparative Example 1 | Comparative Example 2 | Comparative Example 3 | Comparative Example 4 |
|---|---|---|---|---|---|
| JSR N640H | 100 | — | — | — | — |
| JSR N230S | — | 100 | — | — | — |
| Nipol AR-72 | — | — | 100 | — | — |
| Zetpol 2020 | — | — | — | 100 | — |
| Viton E-430 | — | — | — | — | 100 |
| Stearic acid | 1 | 1 | 1 | 1 | — |
| Nocrac CD | 2 | 2 | 2 | 2 | — |
| Hydrozincite #1 | — | 5 | — | — | — |
| Reinforcing filler | | | | | |
| Nipsil ER | — | 45 | — | — | — |
| Carplex #1120 | 45 | — | 50 | — | — |
| FEF carbon | — | — | — | 50 | — |
| MT carbon | — | — | — | — | 30 |
| Vulcanization agent | | | | | |
| Sulfur | — | 0.5 | 0.3 | — | — |
| Accelerator TT | — | 2 | — | — | — |
| Accelerator CZ | — | 2 | — | — | — |
| Sodium stearate | — | — | 3 | — | — |
| Potassium stearate | — | — | 0.5 | — | — |
| Percumyl D-40 | 3 | — | — | — | — |
| Peroximon F-40 | — | — | — | 8 | — |
| Vulcanization accelerator | | | | | |
| Kyowamag #150 | 10 | — | — | — | 3 |
| Calcium hydroxide | — | — | — | — | 6 |
| KEM503 | 1 | 1 | 1 | — | — |
| Plasticizer DOP | 5 | 5 | — | — | — |
| Vulcanization condition | | | | | |
| Primary press vulcanization | 180° C. 5 min | 170° C. 3 min | 180° C. 3 min | 180° C. 5 min | 180° C. 5 min |
| Secondary oven vulcanization | 150° C. 4 hrs | — | 150° C. 4 hrs | 150° C. 4 hrs | 230° C. 24 hrs |

TABLE 2

| | Test Example 1 | Comparative Example 1 | Comparative Example 2 | Comparative Example 3 | Comparative Example 4 |
|---|---|---|---|---|---|
| Dry mechanical properties | | | | | |
| Hardness (JIS-A) | 65 | 71 | 63 | 75 | 70 |
| Tensile strength (MPa) | 15.03 | 19.80 | 8.95 | 28.45 | 12.51 |
| Elongation (%) | 372 | 584 | 135 | 287 | 302 |
| Heat aging test [Evaluation] (heating in air 150° C. × 70 hrs) | ○ | x | ○ | ○ | ○ |
| Hardness change (pts.) | +12 | +16 | +2 | +6 | +1 |
| Tensile strength change (%) | +2 | −39 | +3 | −3 | −3 |
| Elongation change (%) | −40 | −74 | ±0 | −10 | +2 |
| Compression set test [Evaluation] (150° C. × 70 hrs) | ○ | x | ○ | ○ | ○ |
| Compression set (%) | 28 | 76 | 38 | 17 | 18 |
| Oil resistance (JIS No. 3) [Evaluation] (150° C. × 70 hrs) | ○ | ○ | ○ | ○ | ○ |
| Hardness change (pts.) | −11 | −8 | −9 | −9 | ±0 |
| Tensile strength change (%) | −21 | −25 | −19 | −6 | −1 |
| Elongation change (%) | −14 | −4 | −15 | +3 | +2 |
| Volume change (%) | +20 | +11 | +22 | +20 | +2 |
| PAG resistance test [Evaluation] (150° C. × 70 hrs.) | ○ | x | x | ○ | ○ |
| Hardness change (pts.) | −1 | +8 | −13 | −2 | −1 |
| Tensile strength change (%) | −3 | −28 | −11 | ±0 | +3 |
| Elongation change (%) | −7 | −60 | −8 | +2 | ±0 |
| Volume change (%) | +5 | −3 | +26 | +7 | +1 |
| Water resistance [Evaluation] (100° C. × 70 hrs.) | ○ | ○ | x | ○ | ○ |
| Hardness change (pts.) | +8 | +2 | −14 | −1 | −4 |
| Tensile strength change (%) | +1 | +1 | −31 | +3 | −5 |
| Elongation change (%) | +6 | +2 | +35 | +3 | +6 |
| Volume change (%) | +16 | +5 | +32 | +1 | +9 |
| Abrasion resistance test [Evaluation] | ○ | ○ | x | ○ | Δ |
| Relative abrasion loss | 100 | 82 | 212 | 53 | 121 |

TABLE 2-continued

|  | Test Example 1 | Comparative Example 1 | Comparative Example 2 | Comparative Example 3 | Comparative Example 4 |
| --- | --- | --- | --- | --- | --- |
| Cost [Evaluation] | ○ | ○ | Δ | x | x |
| Ratio | 1 | 0.8 | 1.6 | 6 | 10 |

TABLE 3

|  |  | Test Example | Comparative Example | | | | |
| --- | --- | --- | --- | --- | --- | --- | --- |
| Component (weight parts) |  | 2 | 5 | 6 | 7 | 8 | 9 |
|  | JSR N640H | 100 | 100 | 100 | 100 | 100 | 100 |
|  | Stearic acid | 1 | 1 | 1 | 1 | 1 | — |
|  | Nocrac CD | 2 | 2 | 2 | 2 | 2 | 2 |
|  | Hydrozincite #1 | — | — | — | — | 5 | 5 |
| Reinforcing filler | Nipsil ER | 45 | — | — | — | — | — |
|  | Carplex #1120 | — | — | — | — | 45 | — |
|  | Carplex XR | — | 45 | — | — | — | — |
|  | SRF carbon | — | — | 30 | — | — | 30 |
|  | MT carbon | — | — | 50 | — | — | 50 |
|  | Satintone No.5 | — | — | — | 90 | — | — |
| Vulcanization agent | Sulfur | — | — | — | — | 0.5 | 0.5 |
|  | Accelerator TT | — | — | — | — | 2 | 2 |
|  | Accelerator CZ | — | — | — | — | 2 | 2 |
|  | Percumyl D-40 | 3 | 3 | 3 | 3 | — | — |
| Vulcanization accelerator | Kyowamag #150 | 10 | 10 | 10 | 10 | — | — |
|  | Calcium hydroxide | — | — | — | — | — | — |
| KBM503 |  | 1 | 1 | 1 | 1 | 1 | — |
| Plasticizer DOP |  | 5 | 5 | 5 | 5 | 5 | 5 |
| Vulcanization condition | Primary press vulcanization | 180° C. 5 min | 180° C. 5 min | 180° C. 5 min | 180° C. 5 min | 180° C. 5 min | 180° C. 5 min |
|  | Secondary oven vulcanization | 150° C. 4 hrs | 150° C. 4 hrs | 150° C. 4 hrs | 150° C. 4 hrs | — | — |

TABLE 4

|  | Test Example 1 | Test Example 2 | Comparative Example 5 | Comparative Example 6 | Comparative Example 7 | Comparative Example 8 | Comparative Example 9 |
| --- | --- | --- | --- | --- | --- | --- | --- |
| Dry mechanical properties |  |  |  |  |  |  |  |
| Hardness (JIS-A) | 65 | 64 | 73 | 64 | 69 | 61 | 65 |
| Tensile strength (MPa) | 15.03 | 17.81 | 18.41 | 16.80 | 12.48 | 14.00 | 13.85 |
| Elongation (%) | 372 | 335 | 278 | 263 | 250 | 453 | 385 |
| Heat aging test [Evaluation] (heating in air 140° C. × 336 hrs) | ○ | Δ | X | X | X | X | X |
| Hardness change (pts.) | +17 | +18 | +18 | +24 | +18 | +26 | +28 |
| Tensile strength change (%) | −19 | −34 | −39 | −25 | +15 | −18 | +21 |
| Elongation change (%) | −62 | −70 | −80 | −85 | −80 | −83 | −90 |
| Compression set test [Evaluation] (140° C. × 70 hrs) | ○ | ○ | ○ | ○ | ○ | X | ○ |
| Compression set (%) | 24 | 24 | 30 | 21 | 23 | 59 | 30 |

EXAMPLES

Referring to the drawings, several examples in which the sealing member according to the present invention is applied are now described.

In FIG. 1, the reference numeral 1 indicates an inner ring, 2 an outer ring, 3 a ball, 4 a cage, and 5 and 6 each an oil seal. The oil seals 5 and 6 are formed from a modified nitrile rubber according to the present invention, with the outside periphery thereof being fixedly mounted on the outer ring 2 and the inside periphery being slidably in contact with the inner ring 1 and having a metal case 8 therewithin. The internal clearance 7 is filled with, for example, a diurea type grease.

The roller bearing is not limited to the double row ball bearing shown in FIG. 1 but the present invention can be applied to single row ball bearings, needle roller bearings, cylindrical roller bearings and the like as well.

Figure 2:
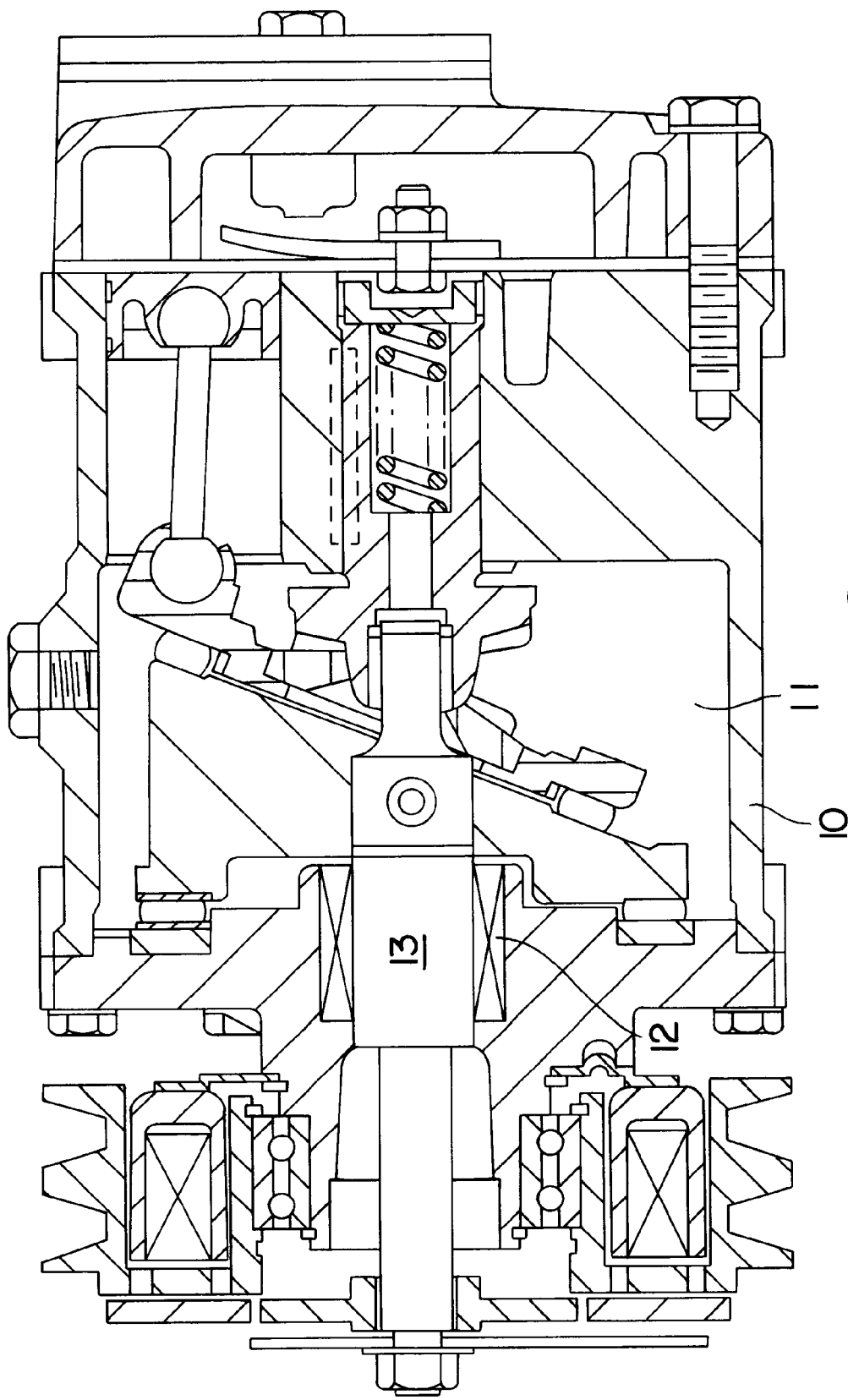
FIG. 2 shows a cross section of a swash plate type rotary compressor.
Figure 3:
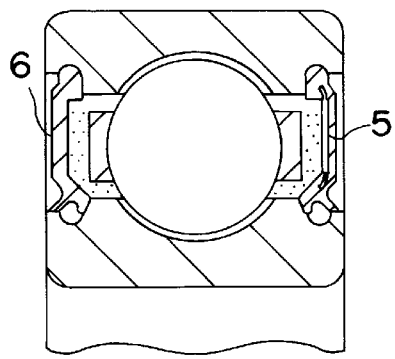
FIG. 3 shows a cross section of an alternator bearing.
Figure 4:
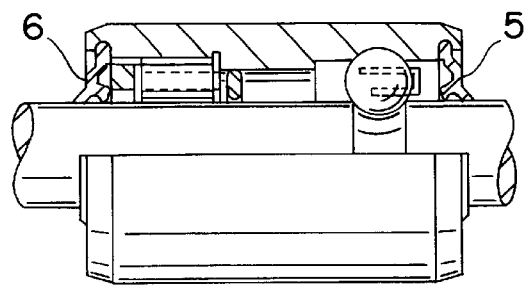
FIG. 4 shows a cross section of a water pump bearing.
Figure 5:
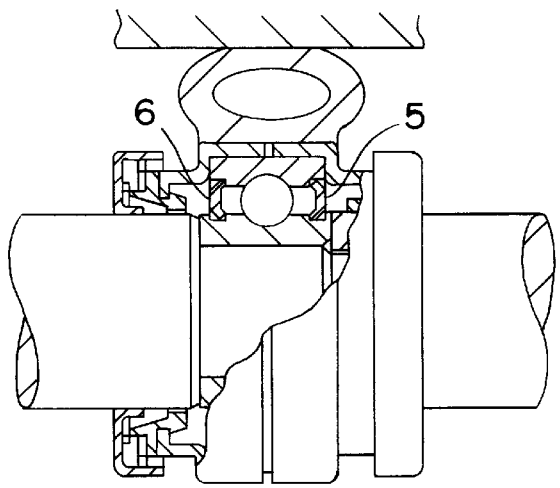
FIG. 5 shows a cross section of a center bearing.
Figure 6:
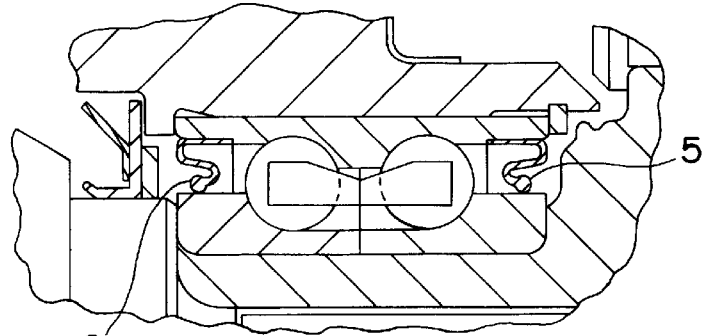
FIG. 6 shows a cross section of a wheel bearing.
Figure 7:
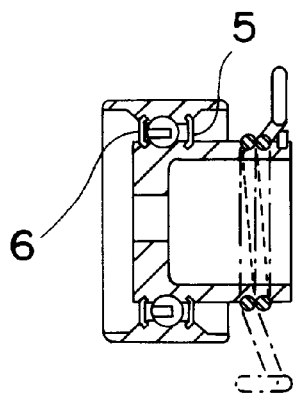
FIG. 7 shows cross section of a tension pully bearing.
Figure 8:
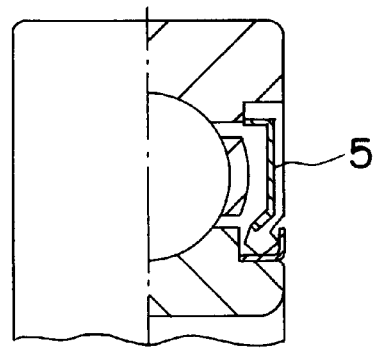
FIG. 8 shows a cross section of a crank bearing.
Figure 9:
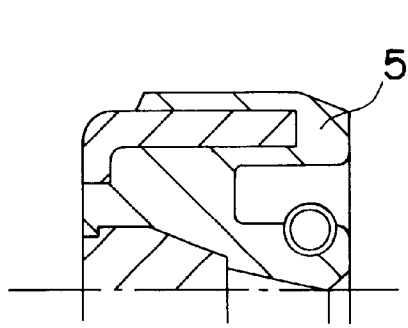
FIG. 9 shows a cross section of a steering rod seal.
Figure 10:
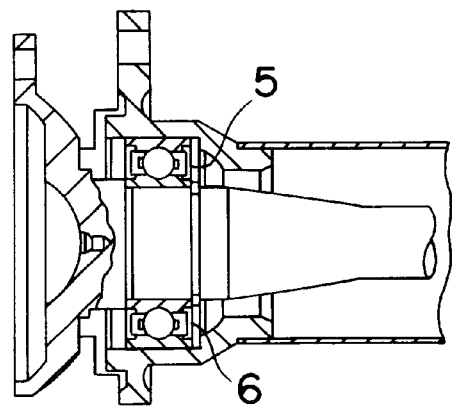
FIG. 10 shows a cross section of a differential axle mechanism.

FIG. 2 illustrates an example in which a sealing member according to the present invention is applied to a swash type rotary compressor. FIG. 3 illustrates an example in which a sealing member according to the present invention is applied to an alternator bearing. FIG. 4 illustrates an example in which a sealing member according to the present invention is applied to a water pump bearing. FIG. 5 illustrates an example in which a sealing member according to the present invention is applied to a center bearing. FIG. 6 illustrates an example in which a sealing member according to the present invention is applied to an axle bearing. FIG. 7 illustrates an example in which a sealing member according to the present invention is applied to a tension pulley bearing. FIG. 8 illustrates an example in which a sealing member according to the present invention is applied to a crank bearing. FIG. 9 illustrates an example in which a sealing member according to the present invention is applied as a steering rod seal. FIG. 10 illustrates an example in which a sealing member according to the present invention is applied to a bearing for a differential mechanism.

In Table 5 given below, comparisons were made among the electromagnetic clutch bearing seal shown in FIG. 1, the alternater bearing seal shown in FIG. 3, the water pump bearing seal shown in FIG. 4, the wheel bearing seal shown in FIG. 6, the oil seal for reciprocating movement shown in FIG. 9 and a general oil seal for rotational motion (not illustrated), for each of which a sealing member of the present invention is used, on one hand and, on the other, those made of NBR, ACM, hydrogenated NBR or FKM which have hitherto used. The test conditions for the various application examples were as follows:

1) Electromagnetic clutch bearing seal: 140° C.×12,000 rpm×1,000 hours
2) Alternator bearing seal: 140° C.×18,000 rpm×1,000 hours
3) Water pump bearing seal: 120° C.×6,000 rpm×1,000 hours of spraying with the vapor of 50% aqueous solution of LLC (long life coolant)
4) Wheel bearing seal: 1,500 rpm×1,000 hours, muddy water (JIS 8-kind dust, 5% by weight)
5) Oil seal for reciprocating movement: 120° C.×80 kgf/cm$^2$×10$^4$ reciprocations
6) Oil seal for rotational motion: 130° C.×4,000 rpm×1,000 hours, gear oil (75w-90)

In Table 5, the following evaluation criteria are used:
○: Good
Δ: Rather poor
X: Poor of the butadiene-acrylonitrile-acrylate type which contains an organic peroxide as a vulcanization agent, a metal oxide as a vulcanization accelerator, and a basic silicic acid as a reinforcing filler.

What is claimed is:

1. A sealing member characterized by having an elastic part formed by molding a modified nitrile rubber of the butadiene-acrylonitrile-acrylate type which contains an organic peroxide as a vulcanization agent, a metal oxide as a vulcanization accelerator and a basic silicic acid as a reinforcing filler, wherein said basic silicic acid is contained in an amount of 10 to 60 parts by weight per 100 parts by weight of the modified nitrile rubber.

2. The sealing member according to claim 1, wherein said metal oxide is magnesium oxide.

3. The sealing member according to claim 1, wherein said metal oxide is contained in an amount of 5 to 20 parts by weight per 100 parts by weight of the modified nitrile rubber.

4. The sealing member according to claim 1, wherein said organic peroxide is dicumyl peroxide.

5. The sealing member according to claim 1, wherein said organic peroxide is contained in an amount of 1 to 10 parts by weight per 100 parts by weight of the modified nitrile rubber.

6. The sealing member according to claim 1 which has a metal case therewithin.

7. A sealed bearing having a sealing member characterized in that said sealing member has an elastic part formed by molding a modified nitrile rubber of the butadiene-acrylonitrile-acrylate type which contains an organic peroxide as a vulcanization agent, a metal oxide as a vulcanization accelerator and a basic silicic acid as a reinforcing filler, wherein said basic silicic acid is contained in an amount of 10 to 60 parts by weight per 100 parts by weight of the modified nitrile rubber.

TABLE 5

|  | Test Example 1 | NBR | ACM | Hydrogenated NBR | FKM |
| --- | --- | --- | --- | --- | --- |
| Electromagnetic clutch bearing seal | ○ | X (bearing failure revealed by grease leakage) | ○ | — | — |
| Alternator bearing seal | ○ | X (bearing failure revealed by grease leakage) | ○ | — | — |
| Water pump bearing seal | ○ | X (hardening and failure of lip) | ○ | ○ | X (permanent set and failure of lip) |
| Wheel bearing seal | ○ | ○ | X (softening and failure of lip) | ○ | ○ |
| Oil seal for reciprocating movement | ○ | Δ (hardening of lip and oil leakage) | — | ○ | — |
| Oil seal for rotational motion | ○ | X (hardening of lip and oil leakage) | ○ | ○ | ○ |

INDUSTRIAL APPLICABILITY

The present invention provides a sealing member which satisfactorily has those fundamental properties required thereof, namely sealing property, heat resistance, mechanical strength and oil resistance and is, in addition, excellent in creep resistance and PAG resistance, since the sealing member is constituted by molding a modified nitrile rubber 8. The sealed bearing according to claim 7, wherein said metal oxide is magnesium oxide.

9. The sealed bearing according to claim 7, wherein said metal oxide is contained in an amount of 5 to 20 parts by weight per 100 parts by weight of the modified nitrile rubber.

10. The sealed bearing according to claim 7, wherein said organic peroxide is dicumyl peroxide.

11. The sealed bearing according to claim 7, wherein said organic peroxide is contained in an amount of 1 to 10 parts by weight per 100 parts by weight of the modified nitrile rubber.

12. The sealed bearing according to claim 7, wherein said sealing member has a metal case therewithin.

* * * * *